US010869088B2

United States Patent
Xiong et al.

(10) Patent No.: US 10,869,088 B2
(45) Date of Patent: Dec. 15, 2020

(54) VIDEO QUALITY ASSESSMENT METHOD AND DEVICE

(71) Applicant: Huawei Technologies Co., Ltd., Shenzhen (CN)

(72) Inventors: Jie Xiong, Nanjing (CN); Li Xue, Nanjing (CN); Yihong Huang, Nanjing (CN); Youqing Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/376,425

(22) Filed: Apr. 5, 2019

(65) Prior Publication Data

US 2019/0238930 A1 Aug. 1, 2019

Related U.S. Application Data

(63) Continuation of application No. PCT/CN2017/102965, filed on Sep. 22, 2017.

(30) Foreign Application Priority Data

Oct. 8, 2016 (CN) .......................... 2016 1 0882670

(51) Int. Cl.
*H04N 21/442* (2011.01)
*H04N 21/6437* (2011.01)
(Continued)

(52) U.S. Cl.
CPC ........... *H04N 21/442* (2013.01); *H04N 17/00* (2013.01); *H04N 17/004* (2013.01);
(Continued)

(58) Field of Classification Search
CPC ............. H04N 21/442; H04N 21/6437; H04N 21/44008; H04N 21/64792; H04N 17/004; H04N 17/00
See application file for complete search history.

(56) References Cited

U.S. PATENT DOCUMENTS 9,124,953 B2 * 9/2015 Henocq .......... H04N 21/234327
9,148,351 B2 * 9/2015 Yuan .................... H04L 41/5009
(Continued)

FOREIGN PATENT DOCUMENTS

CN 101686106 A 3/2010
CN 102651821 A 8/2012
(Continued)

OTHER PUBLICATIONS

Machine Translation and Abstract of Chinese Publication No. CN101686106, Mar. 31, 2010, 16 pages.
(Continued)

*Primary Examiner* — Oschta I Montoya
(74) *Attorney, Agent, or Firm* — Conley Rose, P.C.

(57) ABSTRACT

A video quality assessment method includes obtaining a video quality assessment parameter of a to-be-assessed video, where the video quality assessment parameter of the to-be-assessed video includes an average packet loss gap of the to-be-assessed video, determining packet loss dispersion of the to-be-assessed video based on the video quality assessment parameter of the to-be-assessed video, and determining quality of the to-be-assessed video based on a packet loss rate of the to-be-assessed video, an average consecutive packet loss length of the to-be-assessed video, the packet loss dispersion of the to-be-assessed video, and attribute information of the to-be-assessed video. Therefore, during video quality assessment, impact of packet loss distribution indicated by the packet loss dispersion on the video quality is considered.

21 Claims, 2 Drawing Sheets

US 10,869,088 B2

Page 2

(51) Int. Cl.
H04N 17/00 (2006.01)
H04N 21/44 (2011.01)
H04N 21/647 (2011.01)

(52) U.S. Cl.
CPC ... H04N 21/44008 (2013.01); H04N 21/6437 (2013.01); H04N 21/64792 (2013.01)

(56) References Cited

U.S. PATENT DOCUMENTS

| | | | |
|---|---|---|---|
| 9,247,182 B2* | 1/2016 | Barnea | H04N 21/23412 |
| 9,295,065 B2* | 3/2016 | Dahod | H04N 21/6131 |
| 9,699,400 B2* | 7/2017 | Kardashov | H04W 4/70 |
| 10,021,402 B2 | 7/2018 | Yang | H04N 17/004 |
| 10,237,144 B2* | 3/2019 | Yoon | H04L 41/5025 |
| 2013/0055331 A1 | 2/2013 | Karacali-Akyamac | |
| 2014/0020004 A1 | 1/2014 | Hu et al. | |
| 2014/0086073 A1 | 3/2014 | Baykal et al. | |
| 2014/0328198 A1 | 11/2014 | Gao et al. | |
| 2014/0348224 A1* | 11/2014 | Ali | H04N 19/166 375/240.02 |
| 2015/0015722 A1 | 1/2015 | Wildfeuer et al. | |
| 2015/0097971 A1 | 4/2015 | Gao et al. | |
| 2015/0110204 A1 | 4/2015 | Sun et al. | |

FOREIGN PATENT DOCUMENTS

| | | |
|---|---|---|
| CN | 103379360 A | 10/2013 |
| CN | 103945213 A | 7/2014 |
| CN | 104837008 A | 8/2015 |
| CN | 105379267 A | 3/2016 |
| CN | 105430383 A | 3/2016 |
| CN | 105611543 A | 5/2016 |
| JP | 2015526958 A | 9/2015 |
| JP | 2015528264 A | 9/2015 |
| WO | 2012054209 A1 | 4/2012 |

OTHER PUBLICATIONS

Machine Translation and Abstract of Chinese Publication No. CN103945213, Jul. 23, 2014, 25 pages.
"Series P: Terminals and Subjective and Objective Assessment Methods, Models and tools for quality assessment of streamed media, Parametric non-intrusive assessment of audiovisual media streaming quality—Higher resolution application area," ITU-T P.1201. 2, Oct. 2012, 56 pages.
"Series G: Transmission Systems and Media, Digital Systems and Networks, Multimedia Quality of Service and performance—Generic and user-related aspects, Opinion model for network planning of video and audio streaming applications," ITU-T G.1071, Jun. 2015, 36 pages.
"Series H: Audiovisual and Multimedia Systems Infrastructure of audiovisual services—Coding of moving video, High efficiency video coding," ITU-T H.265, Apr. 2015, 634 pages.
Foreign Communication From A Counterpart Application, PCT Application No. PCT/CN2017/102965, English Translation of International Search Report dated Dec. 1, 2017, 2 pages.
Foreign Communication From A Counterpart Application, PCT Application No. PCT/CN2017/102965, English Translation of Written Opinion dated Dec. 1, 2017, 5 pages.
Machine Translation and Abstract of Chinese Publication No. CN104837008, Aug. 12, 2015, 19 pages.
Machine Translation and Abstract of Chinese Publication No. CN105430383, Mar. 23, 2016, 25 pages.
Machine Translation and Abstract of Chinese Publication No. CN105611543, May 25, 2016, 16 pages.
Foreign Communication From A Counterpart Application, Chinese Application No. 201610882670.X, Chinese Office Action dated Jul. 10, 2019, 6 pages.
Singh, V., et al, "Considerations for Selecting RTCP Extended Report (XR) Metrics for the WebRTC Statistics API," draft-ieff-xrblock-rtcweb-rtcp-xr-metrics-04.txt, XP015115375, Sep. 22, 2016, 18 pages.
Huang, R., et al., "Revised G.1071 "Opinion model for network planning of video and audio streaming applications" (for consent)," XP044186280, TD 1062 (GEN/12), ITU-T Draft; Study Period 2013-2016, International Telecommunication Union, Geneva;CH, vol. 13/12, Oct. 20, 2016, 42 pages.
"Series G: Transmission Systems and Media, Digital Systems and Networks, Multimedia Quality of Service and performance—Generic and user-related aspects, Opinion model for network planning of video and audio streaming applications" XP044190013, ITU-T Standard, International Telecommunication Union Geneva;CH, No. G.1071, Nov. 29, 2016, pp. 1-42.
Foreign Communication From A Counterpart Application, European Application No. 17857815.9, Extended European Search Report dated Jun. 25, 2019, 12 pages.
Huang, R., et al., "Considerations for Selecting RTCP Extended Report (XR) Metrics for the RTCWEB Statistics API draft-huang-xrblock-rtcweb-rtcp-xr-metrics-04", Jul. 4, 2014, 15 pages.

* cited by examiner

VIDEO QUALITY ASSESSMENT METHOD AND DEVICE

CROSS-REFERENCE TO RELATED APPLICATIONS

This application is a continuation application of international patent application number PCT/CN2017/102965 filed on Sep. 22, 2017, which claims priority to Chinese patent application number 201610882670.X filed on Oct. 8, 2016, which are incorporated by reference.

TECHNICAL FIELD

Embodiments of the present disclosure relate to the field of video processing technologies, and in particular, to a video quality assessment method and device.

BACKGROUND

A video has become main traffic in a network. Video service experience has become a key indicator for measuring network service quality. With rapid development and wide application of a video service, the video service has an increasingly high requirement on the network. A network parameter is configured when video quality is known, to avoid excessive waste of network resources. Therefore, how to assess quality of a video service in a current network is of increasing significance for a user and an operator.

Currently, during video quality assessment, only a packet loss rate and an average consecutive packet loss length are considered, leading to low quality assessment accuracy.

SUMMARY

Embodiments of the present disclosure provide a video quality assessment method and device to improve video quality assessment accuracy.

According to a first aspect, an embodiment of the present disclosure provides a video quality assessment method. The method includes obtaining, by a video quality assessment device, a video quality assessment parameter of a to-be-assessed video, where the video quality assessment parameter of the to-be-assessed video includes a packet loss rate of the to-be-assessed video, an average consecutive packet loss length of the to-be-assessed video, and an average packet loss gap of the to-be-assessed video, determining, by the video quality assessment device, packet loss dispersion of the to-be-assessed video based on the video quality assessment parameter of the to-be-assessed video, and determining, by the video quality assessment device, quality of the to-be-assessed video based on the packet loss rate of the to-be-assessed video, the average consecutive packet loss length of the to-be-assessed video, the packet loss dispersion of the to-be-assessed video, and attribute information of the to-be-assessed video, where the attribute information of the to-be-assessed video includes a quantity of bits per pixel of the to-be-assessed video and an error concealment manner of the to-be-assessed video. In the present disclosure, during video quality assessment, not only impact of the packet loss rate and an average quantity of consecutively lost packets on the video quality is considered, but also impact of packet loss distribution indicated by the packet loss dispersion on the video quality is considered. Therefore, video quality assessment accuracy can be improved.

With reference to the first aspect, in a first possible implementation of the first aspect, determining, by the video quality assessment device, packet loss dispersion of the to-be-assessed video based on the video quality assessment parameter of the to-be-assessed video includes determining, by the video quality assessment device, a random average packet loss gap of the to-be-assessed video based on the packet loss rate of the to-be-assessed video and the average consecutive packet loss length of the to-be-assessed video, and determining, by the video quality assessment device, the packet loss dispersion of the to-be-assessed video based on the random average packet loss gap of the to-be-assessed video and the average packet loss gap of the to-be-assessed video.

With reference to the first possible implementation of the first aspect, in a second possible implementation of the first aspect, obtaining, by a video quality assessment device, a video quality assessment parameter of a to-be-assessed video includes determining, by the video quality assessment device, that the average packet loss gap of the to-be-assessed video is equal to the random average packet loss gap of the to-be-assessed video. In this way, the average packet loss gap of the to-be-assessed video can be determined when the average packet loss gap of the to-be-assessed video cannot be directly obtained.

With reference to any one of the first aspect or the possible implementations of the first aspect, in a third possible implementation of the first aspect, determining, by the video quality assessment device, quality of the to-be-assessed video based on the video quality assessment parameter of the to-be-assessed video, the packet loss dispersion of the to-be-assessed video, and attribute information of the to-be-assessed video includes determining, by the video quality assessment device, content complexity of the to-be-assessed video based on the quantity of bits per pixel of the to-be-assessed video, determining, by the video quality assessment device, a coding impairment of the to-be-assessed video based on the quantity of bits per pixel of the to-be-assessed video and the content complexity of the to-be-assessed video, determining, by the video quality assessment device, a first assessment parameter based on the coding impairment of the to-be-assessed video, determining, by the video quality assessment device, a second assessment parameter based on the first assessment parameter, the packet loss rate of the to-be-assessed video, the average consecutive packet loss length of the to-be-assessed video, the packet loss dispersion of the to-be-assessed video, and the error concealment manner of the to-be-assessed video, determining, by the video quality assessment device, a transmission impairment of the to-be-assessed video based on the error concealment manner of the to-be-assessed video and the second assessment parameter, and determining, by the video quality assessment device, the quality of the to-be-assessed video based on the transmission impairment of the to-be-assessed video and the coding impairment of the to-be-assessed video. In the technical solution, in a process of determining the quantity of bits per pixel of the to-be-assessed video, a coding parameter of the to-be-assessed video is used, such as a bit rate, a frame rate, a resolution, and a coding type. Therefore, quality of a specific video can be monitored using a specific coding parameter of the video.

According to a second aspect, an embodiment of the present disclosure provides a video quality assessment device. The video quality assessment device includes units that implement any one of the first aspect or the possible implementations of the first aspect.

According to a third aspect, an embodiment of the present disclosure provides a video quality assessment device. The video quality assessment device includes a processor, a memory, and a communications interface. The memory is configured to store an instruction for implementing the method according to any one of the first aspect or the possible implementations of the first aspect. The processor executes the instruction stored in the memory, to implement, in combination with the communications interface, the method according to any one of the first aspect or the possible implementations of the first aspect.

BRIEF DESCRIPTION OF DRAWINGS

To describe the technical solutions in the embodiments of the present disclosure more clearly, the following briefly describes the accompanying drawings describing the embodiments of the present disclosure.

DESCRIPTION OF EMBODIMENTS

The following describes the technical solutions in the embodiments of the present disclosure with reference to the accompanying drawings in the embodiments of the present disclosure.

Figure 1:
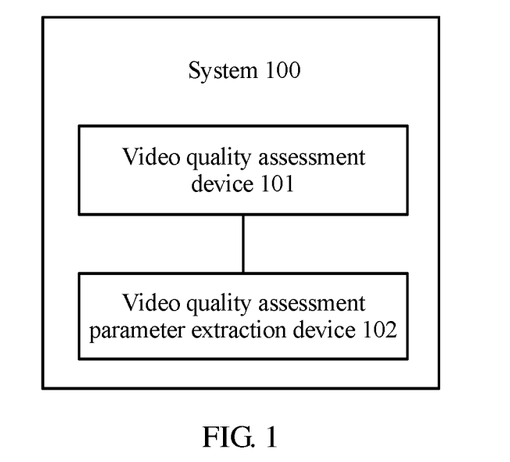
FIG. 1 is a schematic diagram of a video quality assessment system according to an embodiment of the present disclosure.

FIG. 1 is a schematic diagram of a video quality assessment system 100 according to an embodiment of the present disclosure. As shown in FIG. 1, the system 100 includes a video quality assessment device 101 and a video quality assessment parameter extraction device 102. The video quality assessment device 101 may be a device through which a to-be-assessed video flows, such as an optical line terminal (OLT), an optical network unit (ONU), or a set top box, or may be a device configured to assess video quality. The video quality assessment parameter extraction device 102 may be a dedicated network performance measurement device or a network device having a network performance measurement function, such as a router.

The video quality assessment parameter extraction device 102 may be configured to extract a video quality assessment parameter used to assess the video quality, and send the video quality assessment parameter to the video quality assessment device 101.

The video quality assessment device 101 may determine video quality of the to-be-assessed video based on the received video quality assessment parameter.

An embodiment of the present disclosure is further described below with reference to FIG. 2. A video quality assessment device in FIG. 2 may be the video quality assessment device 101 shown in FIG. 1. A video quality assessment parameter extraction device in FIG. 2 may be the video quality assessment parameter extraction device 102 shown in FIG. 1.

Figure 2:
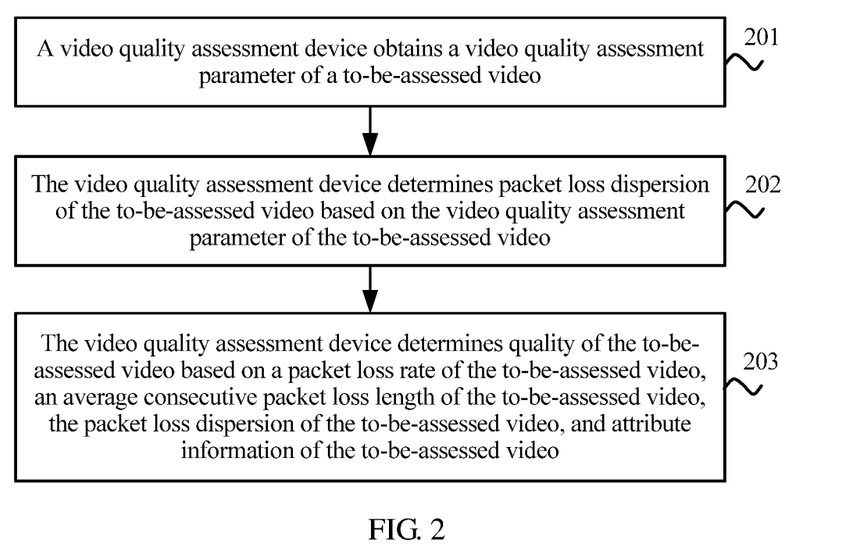
FIG. 2 is a schematic flowchart of a video quality assessment method according to an embodiment of the present disclosure.

FIG. 2 is a schematic flowchart of a video quality assessment method according to an embodiment of the present disclosure.

Step 201. The video quality assessment device obtains a video quality assessment parameter of a to-be-assessed video, where the video quality assessment parameter of the to-be-assessed video includes a packet loss rate of the to-be-assessed video, an average consecutive packet loss length of the to-be-assessed video, and an average packet loss gap of the to-be-assessed video.

Further, the packet loss rate of the to-be-assessed video is a packet loss rate of a video transport stream (TS) packet in a Real-time Transport Protocol (RTP) packet used to transmit the to-be-assessed video. The average consecutive packet loss length of the to-be-assessed video is an average consecutive packet loss length of the video TS packet in the RTP packet used to transmit the to-be-assessed video. The average packet loss gap of the to-be-assessed video is an average packet loss gap of the video TS packet in the RTP packet used to transmit the to-be-assessed video.

The video quality assessment parameter may be determined by the video quality assessment parameter extraction device based on the RTP packet used to transmit the to-be-assessed video. The video quality assessment parameter extraction device may send the extracted video quality assessment parameter to the video quality assessment device. The video quality assessment device may receive the video quality assessment parameter sent by the video quality assessment parameter extraction device. It may be understood that the RTP packet described in this embodiment of the present disclosure is an RTP packet used to transmit audio and video.

One RTP packet may include a plurality of TS packets. Based on different types of carried content, the TS packets may be classified into a video TS packet, an audio TS packet, and the like. The video quality assessment parameter extraction device may determine a type of a TS packet based on a data packet identification number in the TS packet.

Optionally, in some embodiments, the video quality assessment parameter extraction device may determine a total quantity of video TS packets and a total quantity of lost video TS packets in a measurement window. The video quality assessment parameter extraction device may determine the packet loss rate of the to-be-assessed video based on the total quantity of video TS packets and the total quantity of lost video TS packets in the measurement window.

Further, the video quality assessment parameter extraction device may determine the packet loss rate of the to-be-assessed video by obtaining the quantity of lost video TS packets and the total quantity of video TS packets in the measurement window, where the packet loss rate is obtained by dividing the quantity of lost video TS packets by the total quantity of video TS packets.

For example, in the measurement window, the total quantity of video TS packets is 30, and the quantity of lost video TS packets is 6. In this case, the packet loss rate is 6/30, namely, 0.2.

Optionally, in some embodiments, the video quality assessment parameter extraction device may determine a video TS packet loss event and a quantity of lost TS packets in each video TS packet loss event in a measurement window. The video quality assessment parameter extraction device may determine the packet loss rate of the to-be-assessed video and the average consecutive packet loss length of the to-be-assessed video based on the video TS packet loss event and the quantity of lost TS packets in each video TS packet loss event in the measurement window.

Further, the video quality assessment parameter extraction device may determine the average consecutive packet loss length of the to-be-assessed video by obtaining all video TS packet loss events and a quantity of consecutively lost video TS packets in each video TS packet loss event in the measurement window. The video TS packet loss event indicates one event that video TS packets are consecutively lost. The average consecutive packet loss length is equal to an average of quantities of consecutively lost video TS packets in all the video TS packet loss events.

For example, there are four video TS packet loss events in the measurement window in total, and quantities of consecutively lost video TS packets in the video TS packet loss events are 2, 1, 2, and 1, respectively. In this case, the average consecutive packet loss length is (2+1+2+1)/4, namely, 1.5.

Optionally, in some embodiments, the video quality assessment parameter extraction device may determine all video TS packet loss events and a packet loss gap between two adjacent video TS packet loss events in a measurement window. The video quality assessment parameter extraction device may determine the average packet loss gap of the to-be-assessed video based on all the video TS packet loss events and the packet loss gap between two adjacent video TS packet loss events in the measurement window.

Further, the video quality assessment parameter extraction device may determine the average packet loss gap of the to-be-assessed video by obtaining all the video TS packet loss events in the measurement window, and calculating the packet loss gap between two adjacent video TS packet loss events, where the average packet loss gap is equal to an average value of all packet loss gaps.

For example, there are four video TS packet loss events in the measurement window, and packet loss gaps of the video TS packet loss events are 2, 2, and 5, respectively. The average packet loss gap is (2+2+5)/3, namely, 3.

Optionally, in some embodiments, the video quality assessment parameter extraction device may be unable to extract a video TS packet in the RTP packet in some cases. In these cases, the video quality assessment parameter extraction device may determine the packet loss rate of the to-be-assessed video based on a packet loss rate of the RTP packet, determine the average consecutive packet loss length of the to-be-assessed video based on an average consecutive packet loss length of the RTP packet, and determine the average packet loss gap of the to-be-assessed video based on an average packet loss gap of the RTP packet.

For a specific determining process of determining the packet loss rate of the to-be-assessed video and the average consecutive packet loss length of the to-be-assessed video by the video quality assessment parameter extraction device based on the packet loss rate of the RTP packet and the average consecutive packet loss length of the RTP packet, refer to descriptions in the International Telecommunication Union-Telecommunication Standardization Sector (ITU-T) G.1071 standard.

For example, if seven TS packets included in the RTP packet are all video TS packets, the video quality assessment parameter extraction device may determine the packet loss rate of the to-be-assessed video and the average consecutive packet loss length of the to-be-assessed video using the following formulas:

$$PacketLossV=RTPpacketLoss \quad \text{(formula 1.1); and}$$

$$BurstinessV=7 \times RTPburstiness \quad \text{(formula 1.2).}$$

PacketLossV indicates the packet loss rate of the to-be-assessed video, RTPpacketLoss indicates the packet loss rate of the RTP packet, BurstnessV indicates the average consecutive packet loss length of the to-be-assessed video, and RTPburstiness indicates the average consecutive packet loss length of the RTP packet.

For a specific determining process of determining the average packet loss gap of the to-be-assessed video by the video quality assessment parameter extraction device based on the average packet loss gap of the RTP packet, refer to the description of determining an average consecutive packet loss length of a TS packet based on an average consecutive packet loss length of an RTP packet in the ITU-T G.1071 standard. An input parameter in a method, described in the ITU-T G.1071 standard, for determining the average consecutive packet loss length of the TS packet based on the average consecutive packet loss length of the RTP packet is changed to the average packet loss gap of the RTP packet, and in this way, an obtained result is the average packet loss gap of the to-be-assessed video.

For example, if seven TS packets included in the RTP packet are all video TS packets, the video quality assessment parameter extraction device may determine the average packet loss gap of the to-be-assessed video using the following formula:

$$BurstGapV=7 \times RTPburstGap \quad \text{(formula 1.3).}$$

BurstGapV indicates the average packet loss gap of the to-be-assessed video, and RTPburstGap indicates the average packet loss gap of the RTP packet. It can be learned that formula 1.3 is similar to formula 1.2, and an obtained result is the average packet loss gap of the to-be-assessed video after the input is simply changed from the average consecutive packet loss length of the RTP packet to the average packet loss gap of the RTP packet.

Optionally, in some embodiments, the video quality assessment parameter extraction device may be unable to obtain the average packet loss gap of the RTP packet. In these cases, a network may be considered in good condition by default, and packet losses are randomly distributed. The video quality assessment device may determine that the average packet loss gap of the to-be-assessed video is equal to a random average packet loss gap of the to-be-assessed video.

It may be understood that, in some embodiments, the video quality assessment device may directly extract the packet loss rate and the average consecutive packet loss length of the to-be-assessed video. A specific manner of extracting the packet loss rate and the average consecutive packet loss length of the to-be-assessed video by the video quality assessment device is the same as a manner of extracting the packet loss rate and the average packet loss length of the to-be-assessed video by the video quality assessment parameter extraction device, and details are not described herein.

Step 202. The video quality assessment device determines packet loss dispersion of the to-be-assessed video based on the video quality assessment parameter of the to-be-assessed video.

Optionally, in some embodiments, the video quality assessment device may determine the random average packet loss gap of the to-be-assessed video based on the packet loss rate of the to-be-assessed video and the average consecutive packet loss length of the to-be-assessed video. The video quality assessment device may determine the packet loss dispersion of the to-be-assessed video based on the random average packet loss gap of the to-be-assessed video and the average packet loss gap of the to-be-assessed video.

Optionally, in some embodiments, the video quality assessment device may determine the random average packet loss gap of the to-be-assessed video according to the following formula:

$$BurstGap_{random} = \left(\frac{1}{PacketLossV} - 1\right) \times BurstinessV. \quad \text{(formula 1.4)}$$

$BurstGap_{random}$ indicates the random average packet loss gap of the to-be-assessed video, PacketLossV indicates the packet loss rate of the to-be-assessed video, and BurstinessV indicates the average consecutive packet loss length of the to-be-assessed video.

Optionally, in some embodiments, the video quality assessment device may determine the packet loss dispersion of the to-be-assessed video according to the following formula:

$$DiscreteV = \frac{BurstGapV}{BurstGap_{random}}. \quad \text{(formula 1.5)}$$

DiscreteV indicates the packet loss dispersion of the to-be-assessed video, BurstGapV indicates the average packet loss gap of the to-be-assessed video, and $BurstGap_{random}$ indicates the random average packet loss gap of the to-be-assessed video.

It may be learned from formula 1.5 that if the video quality assessment device determines the average packet loss gap of the to-be-assessed video is equal to the random average packet loss gap of the to-be-assessed video, the packet loss dispersion of the to-be-assessed video is 1.

The random average packet loss gap is used to indicate a gap between two adjacent packet losses if a packet loss occurs randomly. A larger value of the random average packet loss gap indicates a larger gap between two adjacent packet losses. A smaller value of the random average packet loss gap indicates a smaller gap between two adjacent packet losses. The packet loss dispersion of the to-be-assessed video is an indicator used to represent a packet loss distribution status. Further, in some embodiments (for example, if the packet loss dispersion is determined according to formula 1.5), a value range of the packet loss dispersion is [0, 1]. When the packet loss is randomly distributed, the packet loss dispersion is maximum, and is equal to 1. More centralized packet loss distribution indicates smaller packet loss dispersion. When the packet loss is centralized in one packet loss event, the packet loss dispersion is minimum, and is equal to 0.

In addition to determining the random average packet loss gap using formula 1.4 and determining the packet loss dispersion of the to-be-assessed video using formula 1.5, the video quality assessment device may determine the random average packet loss gap and the packet loss dispersion of the to-be-assessed video in other manners. For example, the random average packet loss gap of the to-be-assessed video may be determined according to the following formula:

$$BurstGap_{random} = \frac{BurstinessV}{PacketLossV}. \quad \text{(formula 1.6)}$$

The packet loss dispersion of the to-be-assessed video may be determined according to the following formula:

$$DiscreteV = \frac{BurstGap_{random} - BurstGapV}{BurstGap_{random}}. \quad \text{(formula 1.7)}$$

Step 203. The video quality assessment device determines quality of the to-be-assessed video based on the packet loss rate of the to-be-assessed video, the average consecutive packet loss length of the to-be-assessed video, the packet loss dispersion of the to-be-assessed video, and attribute information of the to-be-assessed video, where the attribute information of the to-be-assessed video includes a quantity of bits per pixel of the to-be-assessed video and an error concealment manner of the to-be-assessed video.

Further, the video quality assessment device may determine content complexity of the to-be-assessed video based on the quantity of bits per pixel of the to-be-assessed video, determine a coding impairment of the to-be-assessed video based on the quantity of bits per pixel of the to-be-assessed video and the content complexity of the to-be-assessed video, determine a first assessment parameter based on the coding impairment of the to-be-assessed video, determine a second assessment parameter based on the first assessment parameter, the packet loss rate of the to-be-assessed video, the average consecutive packet loss length of the to-be-assessed video, the packet loss dispersion of the to-be-assessed video, and the error concealment manner of the to-be-assessed video, determine a transmission impairment of the to-be-assessed video based on the error concealment manner of the to-be-assessed video and the second assessment parameter, and determine the quality of the to-be-assessed video based on the transmission impairment of the to-be-assessed video and the coding impairment of the to-be-assessed video.

The quantity of bits per pixel of the to-be-assessed video may be determined based on a bit rate of the to-be-assessed video, a resolution of the to-be-assessed video, and a frame rate of the to-be-assessed video. Optionally, in some embodiments, the video quality assessment device may determine the quantity of bits per pixel of the to-be-assessed video according to the following formula:

$$BitPerPixel = \frac{Bitrate \times 1000000}{numPixelPerFrame \times frameRate}. \quad \text{(formula 1.8)}$$

BitPerPixel indicates the quantity of bits per pixel of the to-be-assessed video, Bitrate indicates the bit rate of the to-be-assessed video, numPixelPerFrame indicates the resolution of the to-be-assessed video, and frameRate indicates the frame rate of the to-be-assessed video.

Optionally, in some embodiments, the video quality assessment device may receive a video coding parameter that is of the to-be-assessed video and that is sent by a video coding parameter obtaining device. The video coding parameter of the to-be-assessed video includes the bit rate of the to-be-assessed video, the frame rate of the to-be-assessed video, and the resolution of the to-be-assessed video. The video coding parameter of the to-be-assessed video may further include a coding type of the to-be-assessed video.

Optionally, in some embodiments, a function of obtaining the video coding parameter of the to-be-assessed video by the video coding parameter obtaining device may be implemented by the video quality assessment device.

Optionally, in some embodiments, the video quality assessment device may determine the content complexity of the to-be-assessed video according to the following formula:

ContentComplexity=$a31 \times \exp(a32 \times BitPerPixel) + a33$ (formula 1.9).

ContentComplexity indicates the content complexity of the to-be-assessed video, BitPerPixel indicates the quantity of bits per pixel of the to-be-assessed video, and a31, a32, and a33 are constants.

Specific values of a31, a32, and a33 may be determined using the least square method. In some embodiments, a31 is a real number greater than 0 and less than 100, a32 is a real number greater than −100 and less than 0, and a33 is a real number greater than 0 and less than 10. In some embodiments, a31=0.74, a32=−1.21, and a33=0.87.

Further, in some embodiments, the constants in formula 1.9 may be determined based on the resolution and the coding type of the to-be-assessed video.

Optionally, in some embodiments, the video quality assessment device may determine the coding impairment of the to-be-assessed video according to the following formula:

QcodV=$a1V \times \exp(a2V \times BitPerPixel) + a3V \times$ContentComplexity+$a4V$ (formula 1.10).

QcodV indicates the coding impairment of the to-be-assessed video, BitPerPixel indicates the quantity of bits per pixel of the to-be-assessed video, ContentComplexity indicates the content complexity of the to-be-assessed video, and a1V, a2V, a3V, and a4V are constants.

Specific values of a1V, a2V, a3V, and a4V may be determined using the least square method. In some embodiments, a1V is a real number greater than 0 and less than 100, a2V is a real number greater than −100 and less than 0, a3V is a real number greater than 0 and less than 10, and a4V is a real number greater than 0 and less than 100. In some embodiments, a1V=68.68, a2V=−73.35, a3V=1.17, and a4V=18.92.

Further, in some embodiments, the constants in formula 1.10 are determined based on the resolution and the coding type of the to-be-assessed video.

Optionally, in some embodiments, the video quality assessment device may determine the first assessment parameter according to the following formula:

$$Icodn = \begin{cases} QcodV, & Qcodv \leq 65 \\ 65, & QcodV > 65 \end{cases}$$ (formula 1.11)

Icodn indicates the first assessment parameter, and QcodV indicates the coding impairment of the to-be-assessed video.

Optionally, in some embodiments, the video quality assessment device determines, based on the error concealment manner of the to-be-assessed video, a constant used to calculate the second assessment parameter. The video quality assessment device may determine the second assessment parameter according to the following formulas:

$$QNP_1 = (b21 - Icodn)\frac{PacketLossV}{Icodn(b22 \times BurstinessV + b23) + PacketLossV};$$ (formula 1.12)

$$QNP_2 = (c21 \times DiscreteV + c22) \times QNP_1 + c23; \text{ and}$$ (formula 1.13)

$$QE = p1 \times \exp(p2 \times QNP_2) - p1.$$ (formula 1.14)

$QNP_1$ indicates a first intermediate parameter, $QNP_2$ indicates a second intermediate parameter, Icodn indicates the first assessment parameter, BurstinessV indicates the average consecutive packet loss length of the to-be-assessed video, DiscreteV indicates the packet loss dispersion of the to-be-assessed video, PacketLossV indicates the packet loss rate of the to-be-assessed video, QE is the second assessment parameter, and b21, b22, b23, c21, c22, c23, p1, and p2 are constants used to calculate the second assessment parameter.

Optionally, in some other embodiments, the video quality assessment device determines, based on the error concealment manner of the to-be-assessed video, a constant used to calculate the second assessment parameter. The video quality assessment device may determine the second assessment parameter according to the following formulas:

$$QNP_1 = (b21 - Icodn)\frac{PacketLossV}{Icodn(b22 \times BurstinessV + b23) + PacketLossV};$$ (formula 1.15)

$$QNP_2 = (c21 \times \exp(DiscreteV) + c22) \times QNP_1 + c23; \text{ and}$$ (formula 1.16)

$$QE = p1 \times \exp(p2 \times QNP_2) - p1.$$ (formula 1.17)

$QNP_1$ indicates a first intermediate parameter, $QNP_2$ indicates a second intermediate parameter, Icodn indicates the first assessment parameter, BurstinessV indicates the average consecutive packet loss length of the to-be-assessed video, DiscreteV indicates the packet loss dispersion of the to-be-assessed video, PacketLossV indicates the packet loss rate of the to-be-assessed video, QE is the second assessment parameter, and b21, b22, b23, c21, c22, c23, p1, and p2 are constants used to calculate the second assessment parameter.

Specific values of b21, b22, b23, c21, c22, c23, p1, and p2 may be determined using the least square method. In some embodiments, b21 is a real number greater than 0 and less than 100, b22 is a real number greater than 0 and less than 1, b23 is a real number greater than 0 and less than 1, c21 is a real number greater than 0 and less than 1, c22 is a real number greater than 0 and less than 10, c23 is a real number greater than −100 and less than 100, p1 is a real number greater than 0 and less than 1, and p2 is a real number greater than 0 and less than 1. In some embodiments, if the error concealment manner of the to-be-assessed video is video freezing, b21=69.39, b22=0.00019, b23=0.00082, c21=0.26411, c22=1.10360, c23=−8.34831, p1=0.0001661, and p2=0.1166. In some embodiments, if the error concealment manner of the to-be-assessed video is slicing, b21=80.61, b22=0.00046, b23=0.00147, c21=0.02, c22=0.66, c23=11.37, p1=0.018, and p2=0.040.

Optionally, in some other embodiments, the video quality assessment device determines, based on the error concealment manner of the to-be-assessed video, a constant used to calculate the second assessment parameter. The video quality assessment device may determine the second assessment parameter according to the following formulas:

$$QNP = (b21 - Icodn)\frac{PacketLossV}{Icodn(b22 \times BurstinessV + b24 \times (1 - DiscreteV) + b23) + PacketLossV}; \text{ and}$$ (formula 1.18)

$$QE = P1 \times \exp(p2 \times QNP) - p1.$$ (formula 1.19)

QNP indicates an intermediate parameter, Icodn indicates the first assessment parameter, BurstinessV indicates the average consecutive packet loss length of the to-be-assessed video, DiscreteV indicates the packet loss dispersion of the to-be-assessed video, PacketLossV indicates the packet loss rate of the to-be-assessed video, QE is the second assessment parameter, and b21, b22, b23, b24, p1, and p2 are constants used to calculate the second assessment parameter.

Specific values of b21, b22, b23, b24, p1, and p2 may be determined using the least square method.

Optionally, in some embodiments, the video quality assessment device determines, based on the error concealment manner of the to-be-assessed video, a constant used to calculate the transmission impairment of the to-be-assessed video, and the video quality assessment device may determine the transmission impairment of the to-be-assessed video according to the following formula:

$$QtraV = b1V \times \log(b2V \times QE + 1) \quad \text{(formula 1.20)}.$$

QtraV indicates the transmission impairment of the to-be-assessed video, QE indicates the second assessment parameter, and b1V and b2V are constants used to calculate the transmission impairment of the to-be-assessed video.

Specific values of b1V and b2V may be determined using the least square method. Optionally, in some embodiments, b1V is a real number greater than 0 and less than 100, and b2V is a real number greater than 0 and less than 1000. In some embodiments, if the error concealment manner of the to-be-assessed video is video freezing, b1V=12.70, and b2V=907.36, or if the error concealment manner of the to-be-assessed video is slicing, b1V=17.73, and b2V is 123.08.

Further, if a packet loss occurs in a video transmission process, there may be a plurality of error concealment manners. A typical error concealment manner is video freezing or slicing. A device that receives a video may preset an error concealment manner. The video quality assessment device may determine the error concealment manner of the to-be-assessed video based on the error concealment manner set by the device that receives the to-be-assessed video in an application environment of the video.

Optionally, in some other embodiments, if the error concealment manner of the to-be-assessed video is video freezing, b1V=12.70, and b2V=907.36. If the error concealment manner of the to-be-assessed video is slicing, b1V=17.73, and b2V=123.08.

The video quality assessment device determines the quality of the to-be-assessed video according to the following formula:

$$Mos = MOSfromR(100 - QcodV - QtraV) \quad \text{(formula 1.21)},$$

where mos indicates the quality of the to-be-assessed video, QcodV indicates the coding impairment of the to-be-assessed video, QtraV indicates the transmission impairment of the to-be-assessed video, MOSfromR is used to convert a quality score whose value range is [0, 100] into a MOS score whose value range is (0, 5). For a specific formula, refer to description in the ITU-T P.1201.2 standard.

In the method shown in FIG. 2, during video quality assessment, not only impact of the packet loss rate and an average quantity of consecutively lost packets on the video quality is considered, but also impact of packet loss distribution indicated by the packet loss dispersion on the video quality is considered. Therefore, video quality assessment accuracy can be improved.

Further, in some embodiments, in a process of determining the quality of the to-be-assessed video, the coding parameter of the to-be-assessed video is used, such as the bit rate, the frame rate, the resolution, and the coding type. Therefore, quality of a specific video can be monitored using a specific coding parameter of the video.

Figure 3:
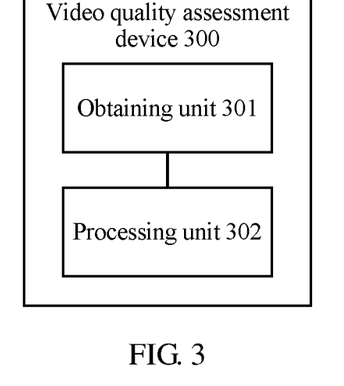
FIG. 3 is a structural block diagram of a video quality assessment device according to an embodiment of the present disclosure.

FIG. 3 is a structural block diagram of a video quality assessment device 300 according to an embodiment of the present disclosure. As shown in FIG. 3, the video quality assessment device 300 includes an obtaining unit 301 and a processing unit 302.

The obtaining unit 301 is configured to obtain a video quality assessment parameter of a to-be-assessed video, where the video quality assessment parameter of the to-be-assessed video includes a packet loss rate of the to-be-assessed video, an average consecutive packet loss length of the to-be-assessed video, and an average packet loss gap of the to-be-assessed video.

The processing unit 302 is configured to determine packet loss dispersion of the to-be-assessed video based on the video quality assessment parameter of the to-be-assessed video.

The processing unit 302 is further configured to determine quality of the to-be-assessed video based on the packet loss rate of the to-be-assessed video, the average consecutive packet loss length of the to-be-assessed video, the packet loss dispersion of the to-be-assessed video, and attribute information of the to-be-assessed video, where the attribute information of the to-be-assessed video includes a quantity of bits per pixel of the to-be-assessed video and an error concealment manner of the to-be-assessed video.

Optionally, in some embodiments, the processing unit 302 is further configured to determine a random average packet loss gap of the to-be-assessed video based on the packet loss rate of the to-be-assessed video and the average consecutive packet loss length of the to-be-assessed video, and determine the packet loss dispersion of the to-be-assessed video based on the random average packet loss gap of the to-be-assessed video and the average packet loss gap of the to-be-assessed video.

Optionally, in some embodiments, the processing unit 302 is further configured to determine the random average packet loss gap of the to-be-assessed video according to formula 1.4.

Optionally, in some embodiments, the obtaining unit 301 is further configured to determine that the average packet loss gap of the to-be-assessed video is equal to the random average packet loss gap of the to-be-assessed video.

Optionally, in some embodiments, the processing unit 302 is further configured to determine the packet loss dispersion of the to-be-assessed video according to formula 1.5.

Optionally, in some embodiments, the processing unit 302 is further configured to determine content complexity of the to-be-assessed video based on the quantity of bits per pixel of the to-be-assessed video, determine a coding impairment of the to-be-assessed video based on the quantity of bits per pixel of the to-be-assessed video and the content complexity of the to-be-assessed video, determine a first assessment parameter based on the coding impairment of the to-be-assessed video, determine a second assessment parameter based on the first assessment parameter, the packet loss rate of the to-be-assessed video, the average consecutive packet loss length of the to-be-assessed video, the packet loss dispersion of the to-be-assessed video, and the error concealment manner of the to-be-assessed video, determine a transmission impairment of the to-be-assessed video based on the error concealment manner of the to-be-assessed video and the second assessment parameter, and determine the quality of the to-be-assessed video based on the transmission impairment of the to-be-assessed video and the coding impairment of the to-be-assessed video.

Optionally, in some embodiments, the processing unit 302 is further configured to determine the content complexity of the to-be-assessed video according to formula 1.9.

Optionally, in some embodiments, the processing unit 302 is further configured to determine the coding impairment of the to-be-assessed video according to formula 1.10.

Optionally, in some embodiments, the processing unit 302 is further configured to determine the first assessment parameter according to formula 1.11.

Optionally, in some embodiments, the processing unit 302 is further configured to determine, based on the error concealment manner of the to-be-assessed video, a constant used to calculate the second assessment parameter, and determine the second assessment parameter according to formula 1.12 to formula 1.14.

Optionally, in some other embodiments, the processing unit 302 is further configured to determine, based on the error concealment manner of the to-be-assessed video, a constant used to calculate the second assessment parameter, and determine the second assessment parameter according to formula 1.15 to formula 1.17.

The processing unit 302 is further configured to determine, based on the error concealment manner of the to-be-assessed video, a constant used to calculate the second assessment parameter, and determine the second assessment parameter according to formula 1.18 and formula 1.19.

Optionally, in some embodiments, the processing unit 302 is further configured to determine, based on the error concealment manner of the to-be-assessed video, a constant used to calculate the transmission impairment of the to-be-assessed video, and determine the transmission impairment of the to-be-assessed video according to the formula 1.20.

Optionally, in some embodiments, the processing unit 302 is further configured to determine the quality of the to-be-assessed video according to formula 1.21.

For operations and functions of the obtaining unit 301 and the processing unit 302 of the video quality assessment device 300, refer to the method in FIG. 2. To avoid repetition, details are not described herein again.

Figure 4:
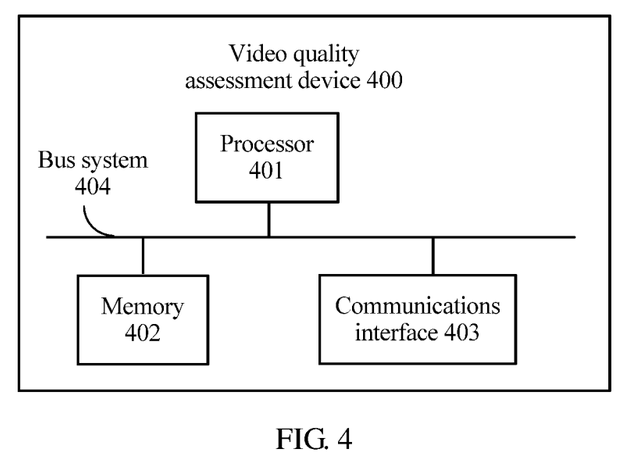
FIG. 4 is a structural block diagram of another video quality assessment device according to an embodiment of the present disclosure.

FIG. 4 is a structural block diagram of another video quality assessment device 400 according to an embodiment of the present disclosure. A video quality assessment device 400 shown in FIG. 4 includes a processor 401, a memory 402, and a communications interface 403.

Components of the video quality assessment device 400 are coupled together using a bus system 404. In addition to a data bus, the bus system 404 includes a power bus, a control bus, and a status signal bus. However, for clarity of description, various buses are marked as the bus system 404 in FIG. 4.

The method disclosed in the foregoing embodiment of the present disclosure may be applied to the processor 401, or implemented by the processor 401. The processor 401 may be an integrated circuit chip, and have a signal processing capability. In an implementation process, steps in the foregoing method may be completed using an integrated logic circuit of hardware in the processor 401 or an instruction in a form of software. The processor 401 may be a general purpose processor, a digital signal processor (DSP), an application-specific integrated circuit (ASIC), a field-programmable gate array (FPGA) or another programmable logic device, a discrete gate or a transistor logic device, or a discrete hardware component. The processor 401 may implement or perform the method, the steps, and logical block diagrams that are disclosed in the embodiments of the present disclosure. The general purpose processor may be a microprocessor, or the processor 401 may be any conventional processor or the like. The steps of the method disclosed in the embodiments of the present disclosure may be directly performed and completed by a hardware decoding processor, or may be performed and completed using a combination of hardware in the decoding processor and a software module. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory 402. The processor 401 reads an instruction from the memory 402, and completes the steps of the foregoing method in combination with the hardware of the processor 401. The communications interface 403 may be configured to obtain a to-be-assessed video or a video quality assessment parameter of a to-be-assessed video.

Optionally, in some embodiments, the memory 402 may store an instruction used to perform the method performed by the video quality assessment device in the method shown in FIG. 2. The processor 401 may execute, in combination with other hardware (such as the communications interface 403), the instruction stored in the memory 402 to complete the steps performed by the video quality assessment device in the method shown in FIG. 2. For a specific working process and a beneficial effect, refer to the description of the video quality assessment device in the embodiment shown in FIG. 2.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A video quality assessment method implemented by a video quality assessment device, the method comprising:
   obtaining a video quality assessment parameter of a video, wherein the video quality assessment parameter comprises a packet loss rate of the video, an average consecutive packet loss length of the video, and an average packet loss gap of the video; and determining a quality of the video based on the packet loss rate, the average consecutive packet loss length of the video, a packet loss dispersion, and attribute information of the video, wherein the packet loss dispersion is based on the video quality assessment parameter, wherein the attribute information comprises a quantity of bits per pixel of the video and an error concealment manner of the video, and wherein determining the quality comprises:

determining content complexity of the video based on the quantity;

determining a coding impairment of the video based on the quantity and the content complexity;

determining a first assessment parameter based on the coding impairment;

determining a second assessment parameter based on the first assessment parameter, the packet loss rate, the average consecutive packet loss length, the packet loss dispersion, and the error concealment manner;

determining a transmission impairment of the video based on the error concealment manner and the second assessment parameter; and determining the quality of the video based on the transmission impairment and the coding impairment.

2. The video quality assessment method of claim 1, wherein the packet loss dispersion is based on a random average packet loss gap of the video and the average packet loss gap, and wherein the random average packet loss gap is based on the packet loss rate and the average consecutive packet loss length.

3. The video quality assessment method of claim 2, wherein the random average packet loss gap is based on the following formula:

$$BurstGap_{random} = \left(\frac{1}{PacketLossV} - 1\right) \times BurstinessV,$$

wherein $BurstGap_{random}$ is the random average packet loss gap, wherein $PacketLossV$ is the packet loss rate, and wherein $BurstinessV$ is the average consecutive packet loss length.

4. The video quality assessment method of claim 2, wherein obtaining the video quality assessment parameter comprises, determining that the average packet loss gap is equal to the random average packet loss gap.

5. The video quality assessment method of claim 2, the packet loss dispersion is based on the following formula:

$$DiscreteV = \frac{BurstGapV}{BurstGap_{random}},$$

wherein $DiscreteV$ is the packet loss dispersion, wherein $BurstGapV$ is the average packet loss gap, and wherein $BurstGap_{random}$ is the random average packet loss gap.

6. The video quality assessment method of claim 1, comprises further comprising further determining the content complexity according to the following formula:

$$ContentComplexity = a31 \times e^{(a32 \times BitPerPixel)} + a33,$$

wherein ContentComplexity is the content complexity, wherein BitPerPixel is the quantity, and wherein a31, a32, and a33 are constants.

7. The video quality assessment method of claim 1, coding impairment comprises further comprising further determining the coding impairment according to the following formula:

$$QcodV = a1V \times e^{(a2V \times BitPerPixel)} + a3V \times ContentComplexity + a4V,$$

wherein QcodV is the coding impairment, wherein BitPerPixel is the quantity, wherein ContentComplexity is the content complexity, and wherein a1V, a2V, a3V, and a4V are constants.

8. The video quality assessment method of claim 1, further comprising further determining the first assessment parameter according to the following condition:

$$Icodn = \begin{cases} QcodV, & Qcodv \le 65 \\ 65, & QcodV > 65 \end{cases},$$

wherein Icodn is the first assessment parameter, and wherein QcodV is the coding impairment.

9. The video quality assessment method of claim 1, wherein determining the second assessment parameter comprises:

determining, based on the error concealment manner, a constant to calculate the second assessment parameter; and determining the second assessment parameter according to the following formulas:

$$QNP_1 = (b21 - Icodn)\frac{PacketLossV}{Icodn(b22 \times BurstinessV + b23) + PacketLossV};$$

$$QNP_2 = (c21 \times DiscreteV + c22) \times QNP_1 + c23; \text{ and}$$

$$QE = p1 \times \exp(p2 \times QNP_2) - p1,$$

wherein $QNP_1$ is a first intermediate parameter, wherein $QNP_2$ is a second intermediate parameter, wherein Icodn is the first assessment parameter, wherein BurstinessV is the average consecutive packet loss length, wherein DiscreteV is the packet loss dispersion, wherein PacketLossV is the packet loss rate, wherein QE is the second assessment parameter, and wherein b21, b22, b23, c21, c22, c23, p1, and p2 are constants.

10. The video quality assessment method of claim 1, wherein determining the transmission impairment comprises:

determining, based on the error concealment manner, a constant to calculate the transmission impairment; and determining the transmission impairment according to the following formula:

$$QtraV = b1V \times \log(b2V \times QE + 1),$$

wherein QtraV is the transmission impairment, wherein QE is the second assessment parameter, and wherein b1V and b2V are constants.

11. The video quality assessment method of claim 1, further comprising configuring a network parameter based on the quality.

12. A video quality assessment device comprising:
a memory; and
a processor coupled to the memory and configured to:
obtain a video quality assessment parameter of a video, wherein the video quality assessment parameter comprises a packet loss rate of the video, an average consecutive packet loss length of the video, and an average packet loss gap of the video; and
determine a quality of the video based on the packet loss rate, the average consecutive packet loss length, a packet loss dispersion, and attribute information of the video,
wherein the packet loss dispersion is based on the video quality assessment parameter,
wherein the attribute information comprises a quantity of bits per pixel of the video and an error concealment manner of the video, and
wherein the processor is further configured to further determine the quality by:
determining content complexity of the video based on the quantity;
determining a coding impairment of the video based on the quantity and the content complexity;
determining a first assessment parameter based on the coding impairment;
determining a second assessment parameter based on the first assessment parameter, the packet loss rate, the average consecutive packet loss length, the packet loss dispersion, and the error concealment manner;
determining a transmission impairment of the video based on the error concealment manner and the second assessment parameter; and
determining the quality of the video based on the transmission impairment and the coding impairment.

13. The video quality assessment device of claim 12, wherein the packet loss dispersion is based on a random average packet loss gap of the video and the average packet loss gap, and wherein the random average packet loss gap is based on the packet loss rate and the average consecutive packet loss length.

14. The video quality assessment device of claim 13, wherein the random average packet loss gap is based on the following formula:

$$BurstGap_{random} = \left(\frac{1}{PacketLossV} - 1\right) \times BurstinessV,$$

wherein $BurstGap_{random}$ is the random average packet loss gap, wherein PacketLossV is the packet loss, and wherein BurstinessV is the average consecutive packet loss length.

15. The video quality assessment device of claim 13, wherein the processor is further configured to obtain the video quality assessment parameter by determining that the average packet loss gap is equal to the random average packet loss gap.

16. The video quality assessment device of claim 13, wherein the packet loss dispersion is based on the following formula:

$$DiscreteV = \frac{BurstGapV}{BurstGap_{random}},$$

wherein DiscreteV is the packet loss dispersion, wherein BurstGapV is the average packet loss gap, and wherein $BurstGap_{random}$ is the random average packet loss gap.

17. The video quality assessment device of claim 12, wherein the processor is further configured to further determine the content complexity according to the following formula:

$$ContentComplexity = a31 \times e^{(a32 \times BitPerPixel)} + a33,$$

wherein ContentComplexity is the content complexity, wherein BitPerPixel is the quantity, and wherein a31, a32, and a33 are constants.

18. The video quality assessment device of claim 12, wherein the processor is further configured to further determine the coding impairment according to the following formula:

$$QcodV = a1V \times e^{(a2V \times BitPerPixel)} + a3V \times ContentComplexity + a4V,$$

wherein QcodV is the coding impairment, wherein BitPerPixel is the quantity, wherein ContentComplexity is the content complexity, and wherein a1V, a2V, a3V, and a4V are constants.

19. The video quality assessment device of claim 12, wherein the processor is further configured to configure a network parameter based on the quality.

20. A computer program product comprising computer-executable instructions stored on a non-transitory medium that, when executed by a processor, cause an apparatus to:
obtain a video quality assessment parameter of a video, wherein the video quality assessment parameter comprises a packet loss rate of the video, an average consecutive packet loss length of the video, and an average packet loss gap of the video; and
determine a quality of the video based on the packet loss rate, the average consecutive packet loss length, a packet loss dispersion, and attribute information of the video,
wherein the packet loss dispersion is based on the video quality assessment parameter,
wherein the attribute information comprises a quantity of bits per pixel of the video and an error concealment manner of the video, and
wherein the instructions further cause the apparatus to further determine the quality by:
determining content complexity of the video based on the quantity;
determining a coding impairment of the video based on the quantity and the content complexity;
determining a first assessment parameter based on the coding impairment;
determining a second assessment parameter based on the first assessment parameter, the packet loss rate, the average consecutive packet loss length, the packet loss dispersion, and the error concealment manner;
determining a transmission impairment of the video based on the error concealment manner and the second assessment parameter; and
determining the quality of the video based on the transmission impairment and the coding impairment.

21. The computer program product of claim 20, wherein the instructions further cause the apparatus to configure a network parameter based on the quality.

* * * * *

UNITED STATES PATENT AND TRADEMARK OFFICE
CERTIFICATE OF CORRECTION

PATENT NO. : 10,869,088 B2
APPLICATION NO. : 16/376425
DATED : December 15, 2020
INVENTOR(S) : Jie Xiong et al.

Page 1 of 1

It is certified that error appears in the above-identified patent and that said Letters Patent is hereby corrected as shown below:

In the Claims

Claim 4, Column 15, Line 51: "comprises, determining that" should read "comprises determining that"

Claim 9, Column 16, Line 41: "QE=p1 × exp(p2 × QNP$_2$)-p1" should read "$QE = p1 \times e^{(p2 \times QNP_2)} - p1$,"

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*